United States Patent [19]

Chen

[11] Patent Number: 5,329,793
[45] Date of Patent: Jul. 19, 1994

[54] ANTI-THEFT DEVICE FOR A VEHICLE
[76] Inventor: Kun-Chao Chen, Tainan, Taiwan
[21] Appl. No.: 46,226
[22] Filed: Apr. 13, 1993
[51] Int. Cl.⁵ .............................................. B60R 25/02
[52] U.S. Cl. ...................................... 70/209; 70/226; 70/238
[58] Field of Search ............................... 70/198-203, 70/237-239, 209, 225, 226

[56] References Cited

U.S. PATENT DOCUMENTS

| | | | |
|---|---|---|---|
| 1,218,540 | 3/1917 | Fell | 70/226 |
| 1,423,955 | 7/1922 | Miller | 70/203 |
| 1,443,009 | 1/1923 | Davis | 70/226 |
| 1,531,062 | 3/1925 | Barravecchia | 70/202 |
| 4,693,099 | 9/1987 | Cykman | 70/203 X |
| 4,825,671 | 5/1989 | Wu | 70/238 |
| 4,835,999 | 6/1989 | Chant | 70/238 |
| 4,848,110 | 7/1989 | Kuo | 70/238 X |
| 4,936,120 | 6/1990 | Fiks | 70/238 X |
| 5,033,281 | 7/1991 | Kufman et al. | 70/237 X |
| 5,038,667 | 8/1991 | Slater | 70/199 |
| 5,267,458 | 12/1993 | Heh | 70/209 X |

FOREIGN PATENT DOCUMENTS

| | | | |
|---|---|---|---|
| 521195 | 1/1956 | Canada | 70/237 |
| WO90/09911 | 9/1990 | PCT Int'l Appl. | 70/238 |
| 941212 | 11/1963 | United Kingdom | 70/238 |

*Primary Examiner*—Lloyd A. Gall

[57] ABSTRACT

An anti-theft device for a vehicle includes a casing engaged in a housing, a sleeve extended upward from the housing for receiving a lock, a rod having one end rotatably coupled to the casing and the other end slidably engaged in a tube, a ring element pivotally coupled to the tube, and a shank engaged through the housing and the casing so as to form the anti-theft device. The device has a simplified configuration and has a greatly lowered manufacturing cost.

3 Claims, 4 Drawing Sheets

ANTI-THEFT DEVICE FOR A VEHICLE

BACKGROUND OF THE INVENTION (a) Field of the Invention

The present invention relates to an anti-theft device, and more particularly to an anti-theft device for a vehicle.

(b) Description of the Prior Art

Various kinds of anti-theft devices have been developed for locking the foot pedal and the steering wheel or for locking the steering wheel and the gear shift. However, the anti-theft devices have a complicated configuration and thus have an increased manufacturing cost.

The present invention has arisen to mitigate and/or obviate the afore-described disadvantages of the conventional anti-theft devices for vehicles.

SUMMARY OF THE INVENTION

The primary objective of the present invention is to provide an anti-theft device which includes a simplified configuration and has a lowered manufacturing cost.

In accordance with one aspect of the present invention, there is provided an anti-theft device for a vehicle comprising a housing having a chamber formed therein, a sleeve extended upward therefrom, a lock mechanism received in the sleeve; a casing engaged in the housing, an orifice formed in the casing for receiving the lock mechanism; a rod including a first end rotatably coupled to the casing and a second end; a tube including a first end for slidably receiving the second end of the rod and a second end; means for securing the second end of the rod to the tube; a ring element including an extension extended therefrom and pivotally coupled to the second end of the tube, and a shank engaged through the housing and the casing so as to form the anti-theft device.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
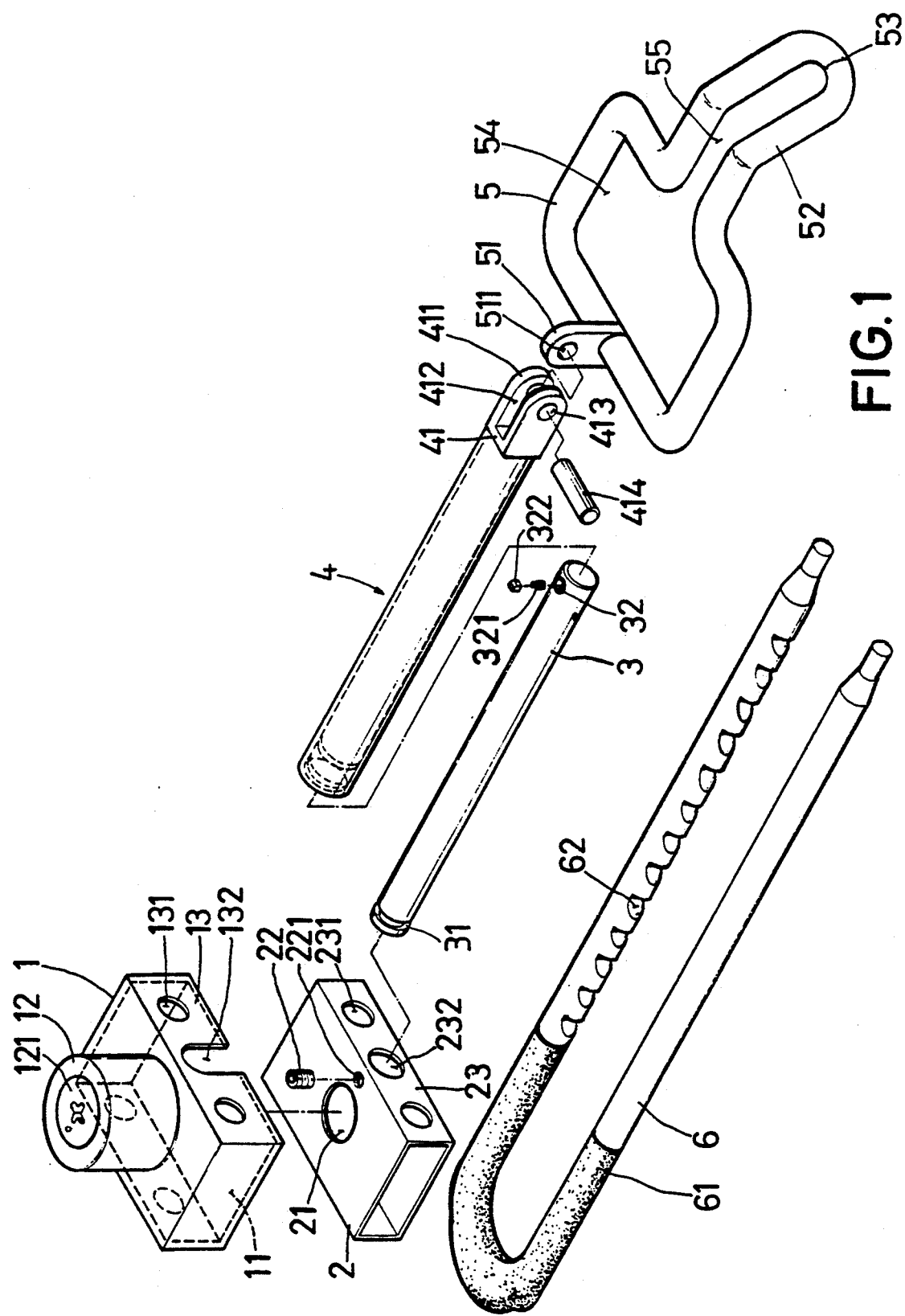
FIG. 1 is an exploded view of an anti-theft device in accordance with the present invention.

Referring to the drawings and initially to FIGS. 1, 2, 2A and 3, an anti-theft device for a vehicle in accordance with the present invention comprises generally a housing 1 for receiving a lock mechanism 121, a casing 2 engaged in the housing 1, a rod 3 having one end coupled to the casing 2 and having the other end slidably engaged in a tube 4, a ring element 5 for engaging with the foot pedal, for example, and a shank 6 engaging with the housing 1 and the casing 2 so as to form the anti-theft device.

The housing 1 includes a chamber 11 formed in the lower portion for receiving the casing 2, a sleeve 12 extended upward therefrom, the lock mechanism 121 is engaged in the sleeve 12, two pairs of holes 131 are oppositely formed in the side surfaces of the housing 1, and a notch 132 is formed in one of the side surfaces of the housing 1 and formed between the holes 131. The casing 2 includes an orifice 21 formed in the upper portion for receiving the lower portion of the lock mechanism 121, two pairs of holes 231 are oppositely formed in the two side surfaces of the casing 2, and an aperture 232 is formed in one of the side surfaces of the casing 2, the holes 231 and the aperture 232 are aligned with the holes 131 and the notch 132 of the housing 1 respectively. One end of the rod 3 is engaged in the aperture 232 of the casing 2 and the notch 132 of the housing 1, and a bolt 22 is engaged through a screw hole 221 of the casing and engaged with an annular groove 31 of the rod 3 such that the rod 3 is rotatably coupled to the casing 2 and the housing 1. The rod 3 includes a dent 32 formed in the other end for receiving a spring 321 and a catch 322.

The tube 4 has a hollow interior for receiving the rod 3 and includes a pair of lugs 411 formed on one end thereof and having a gap 412 formed therebetween, a hole 413 formed in each of the lugs 411 for receiving a pin 414. The ring element 5 includes an extension 51 extended therefrom and engaged between the lugs 411 of the tube 4 and pivotally coupled between the lugs 411 by the pin 414 such that the tube 4 is rotatable about the ring element 5. The ring element 5 includes a bent portion 52 formed thereon opposite to the extension 51 and ended with a curved portion 53, a space 54 formed in the ring element 5 and a slot 55 formed in the bent portion 52. The shank 6 is U-shaped including a protective sleeve 61 engaged in the middle portion and having a plurality of depressions 62 formed in two legs thereof, the legs are engaged through the holes 131 and 231 of the housing 1 and the casing 2. The lock mechanism 121 includes plunger means (not shown) extendible through the orifice 21 for engaging with the depressions 62 of the shank 6 so as to lock the shank 6 in place, the plunger means is conventional and will not be described in further details.

Figure 2:
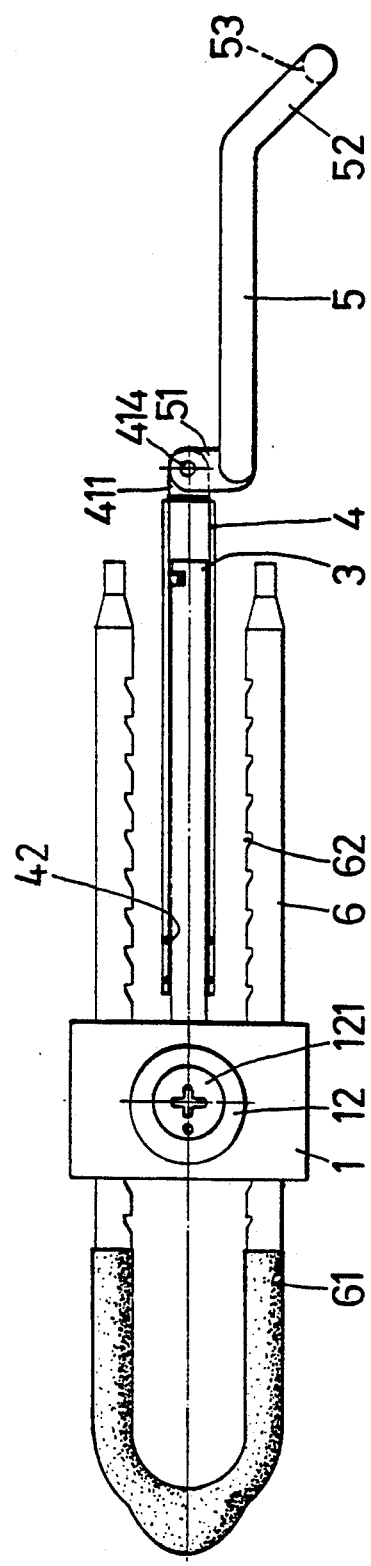
FIG. 2 is a side view of the anti-theft device.
Figure 2A:
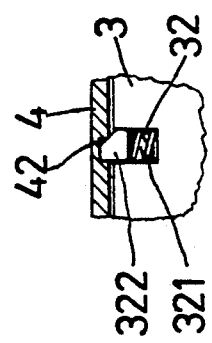
FIG. 2A is a partial cross sectional view illustrating a coupling portion of the anti-theft device.
Figure 3:
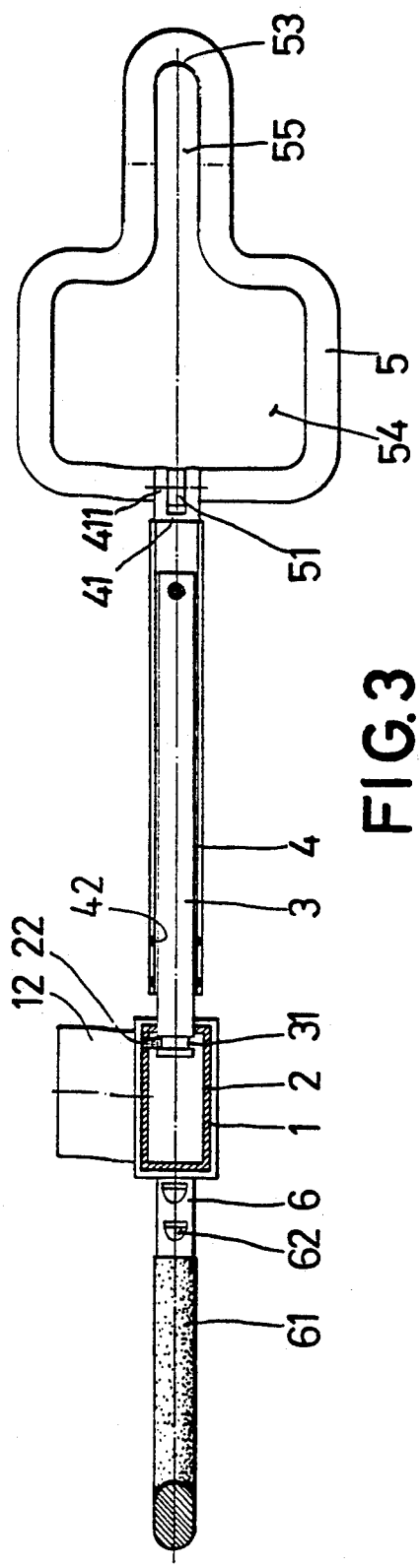
FIG. 3 is a top view of the anti-theft device.
Figure 4:
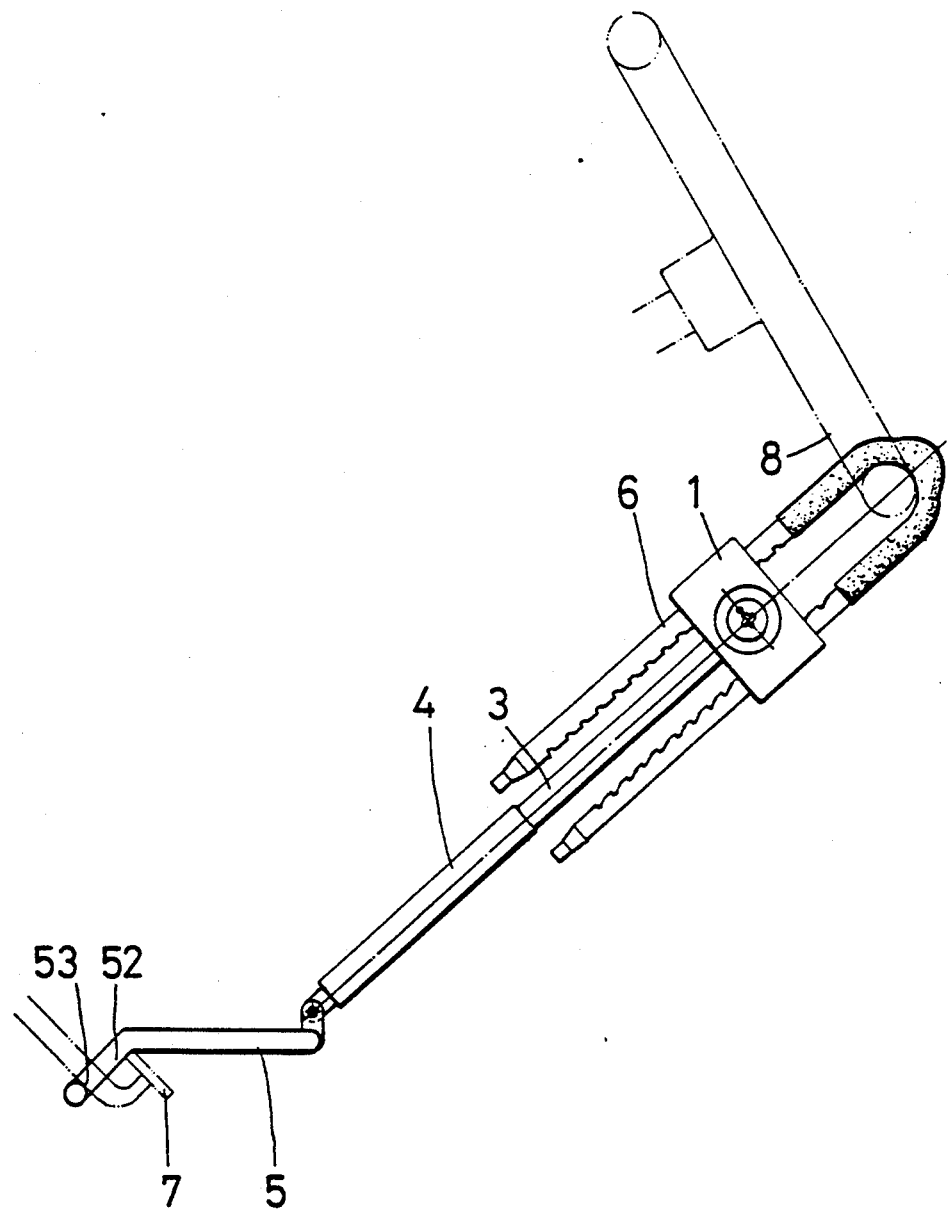
FIG. 4 is a plane view illustrating the utilization of the anti-theft device.

When the rod 3 is pulled outward of the tube 4, as shown in FIG. 4, the catch 322 can be engaged with one of the recesses 42 which are formed in the free end portion of the tube 4 (FIGS. 2 and 3) so as to retain the rod in place (FIG. 2A).

In operation, as shown in FIG. 4, the ring element 5 can be engaged with either the foot pedal or the clutch pedal 7, and the shank 6 can be engaged with the steering wheel 8, in which, the bent portion 52 and the curved portion 53 is solidly engaged with the foot pedal 7 such that the ring element 5 can not be easily disengaged from the foot pedal 7.

Figure 5:
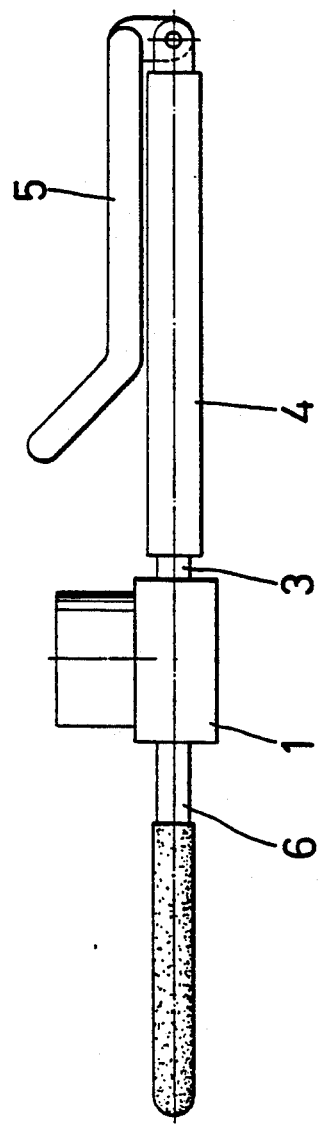
FIG. 5 is a side view illustrating the folding position of the anti-theft device.

As shown in FIG. 5, when the ring element 5 is folded to engage with the tube 4, the anti-theft can be folded to a compact configuration which is good for transportation purposes.

Accordingly, the anti-theft device in accordance with the present invention includes a simplified configuration and has a lowered manufacturing cost.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An anti-theft device for a vehicle comprising a housing having a chamber formed therein, a sleeve extended upward therefrom, a lock mechanism received in said sleeve; a casing engaged in said housing, an orifice formed in said casing for receiving said lock mechanism; a rod including a first end rotatably coupled to said casing and a second end; a tube including a first end for slidably receiving said second end of said rod and a second end; means for securing said second end of said rod to said tube; a ring element including an extension extended therefrom and pivotally coupled to said second end of said tube, and a shank engaged through said housing and said casing so as to form said anti-theft device.

2. An anti-theft device according to claim 1, wherein said first end of said rod includes an annular groove formed therein, and said casing includes a bolt threaded therein and engaged with said annular groove of said rod such that said rod is rotatably coupled to said casing.

3. An anti-theft device according to claim 1, wherein said second end of said rod includes a dent formed therein, a spring and a catch are engaged in said dent, and said tube includes at least one recess formed therein for engaging with said catch so as to couple said rod and said tube together.

* * * * *